Aug. 8, 1933.  G. B. HETHERINGTON  1,921,228
SPACER FOR PILING PIPE
Filed Aug. 17, 1931
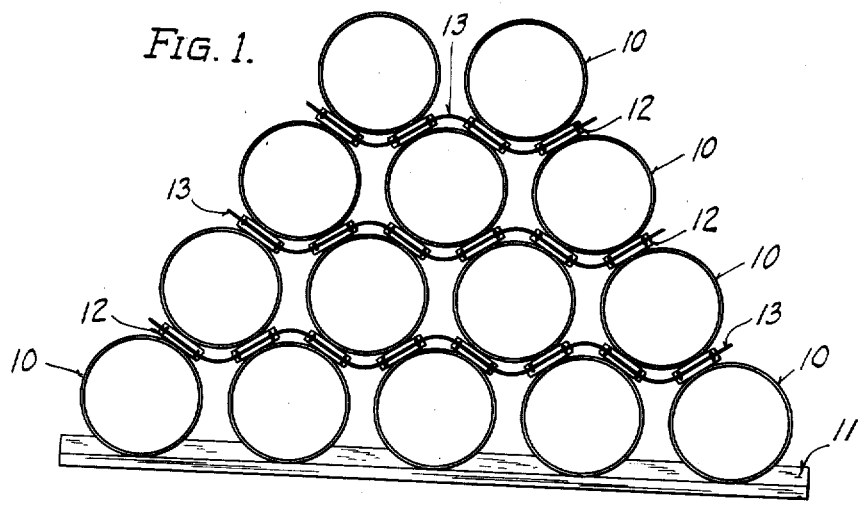
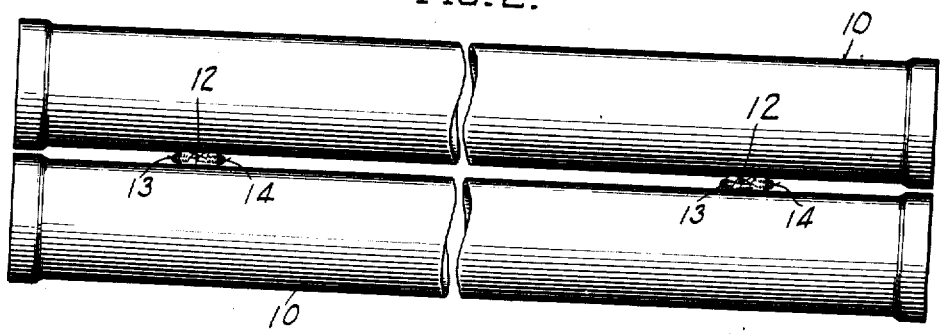
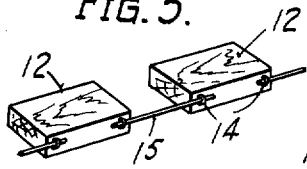
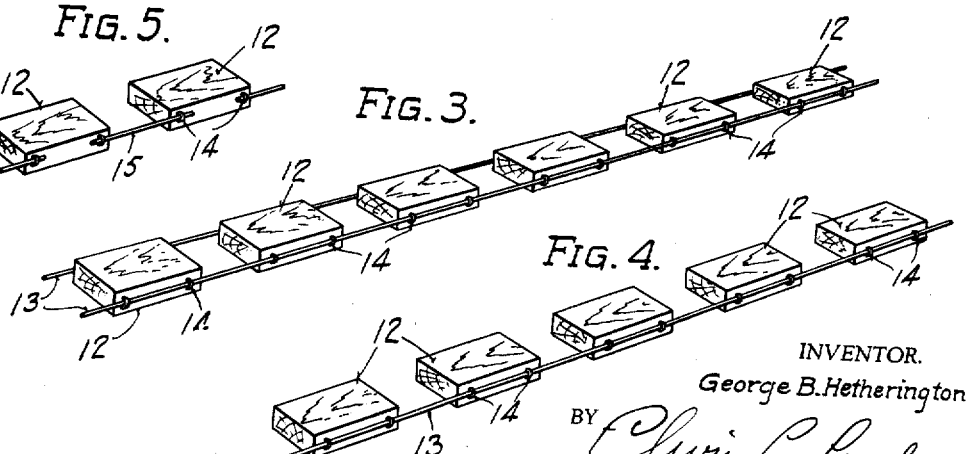
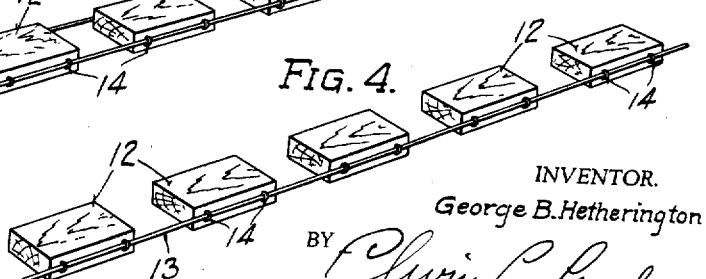
INVENTOR.
George B. Hetherington
BY
ATTORNEY.

Patented Aug. 8, 1933

1,921,228

UNITED STATES PATENT OFFICE

1,921,228

SPACER FOR PILING PIPE

George B. Hetherington, Milwaukee, Wis., assignor to A. O. Smith Corporation, Milwaukee, Wis., a Corporation of New York Application August 17, 1931. Serial No. 557,598

7 Claims. (Cl. 214—6)

The invention relates to spacers for piling pipe.

The object of the invention is to provide for spacing pipe when piled to protect it from damage by the striking together of adjacent pipe lengths.

A further object of the invention is to provide a spacer for piling pipe which may be readily adjusted to permit the settling of the pipe to facilitate the piling operations.

It is also the object of the invention to provide spacers which may be readily assembled from standard stock to accommodate pipe of any size.

For a fuller understanding of the nature and object of the invention, reference may be had to the following detailed description taken in conjunction with the accompanying drawing in which:

Figure 1 is a view in end elevation of a pile of pipe showing a spacer constructed in accordance with my invention disposed between the pipe lengths;

Fig. 2 is a view in side elevation of two pipe lengths showing the blocks of the spacer disposed between them;

Fig. 3 is a perspective view of a spacer showing the blocks supported by two flexible members;

Fig. 4 is a perspective view of a modified form of spacer showing the blocks supported by a single flexible members; and Fig. 5 is a view in perspective of a modified form of spacer constructed by connecting adjacent ends of the blocks by short flexible members.

In piling pipe in a yard for storage or on a car for shipment, provision should be made for supporting the pipe in spaced relation in order that the pipe lengths or units will not be damaged by contacting with one another. This is highly desirable in the case of belled pipe such as shown in Fig. 2.

Referring to the drawing and Fig. 1 in particular, a plurality of pipe lengths 10 are shown piled on the supporting member 11. As shown, the member 11 is provided with a plurality of seats for engaging the pipe along an arc of a circle which extends through a substantial portion of its circumference. The support 11 is of the type usually provided on cars but may also be utilized in yards when the pipe is being piled for storage.

The spacer, which is best illustrated in Figs. 3 and 4, comprises a plurality of blocks 12 which may be of any desired size and material depending upon the piling conditions to be met. The blocks would preferably be made from some suitable wood which is tough and will not readily split. For some purposes a soft wood is preferable since it is much softer than the pipe.

A flexible member or wire 13 is provided for supporting the blocks in spaced relation. As shown in Fig. 3, two flexible wires are provided and connected to the opposite sides of the blocks, while in Fig. 4 only one wire is provided. The number of wires will depend on the piling conditions to be met.

The blocks may be attached to the wire in any suitable manner and in this embodiment of the invention staples 14 are utilized. When staples are used, they may be driven into the block far enough to retain the blocks in the proper spaced relation but establishing a frictional engagement with the wire which may be overcome by the weight of the pipe to permit the shifting of the blocks along the wires to accommodate the spacer to the pipe. The construction of a spacer, in which the blocks may move a certain distance relative to one another, facilitates the piling of the pipe since it may readily settle, each pipe resting on the two below.

The wires or flexible members are connected to the sides of the blocks to protect the pipe from receiving scratches by coming in contact with other metals. Further, when the wires are attached to the sides, the blocks may be more readily moved relative to one another.

The size of the blocks and the spacing of them will depend to some extent on the diameter of the pipe to be piled. The greater the diameter, the farther apart the blocks will be spaced. Further, when the pipe is of large diameter, it is desirable to have a fairly large block so that the pipe may properly embed itself therein.

In providing a spacer for piling belled pipe, the thickness of the block will depend on the diameter of the belled portion. The block must be thick enough to prevent the belled portions from coming in contact. When using spacers in piling pipe, they are placed in horizontal positions across each layer of pipe, the blocks being so spaced that a pair straddles each pipe and takes downwardly and outwardly inclined positions. Therefore adjacent blocks on adjacent pipe are disposed to receive a pipe as shown in Fig. 1. Any desired number of spacers may be utilized in making a pile of pipe.

While in this embodiment of the invention a plurality of blocks are shown mounted on long flexible members, the spacer may be constructed by connecting the ends of adjacent blocks 12 by short flexible members 15, as shown in Fig. 5.

Wooden blocks are suitable for constructing spacers since they have a high coefficient of friction and when used in piling pipe in cars, will offer great resistance to longitudinal movement of the pipe when the cars are subjected to sudden shocks such as occur during stopping and starting and the shunting of the car in freight yards. However, there are many other suitable materials which possess the same characteristics as wood.

Since numerous changes may be made in the above described structures and different embodiments of the invention may be made without departing from the spirit and scope thereof, it is intended that all matter contained in the above description or shown in the accompanying drawing shall be interpreted as illustrative and not in a limiting sense.

I claim:

1. In a spacer for piling pipe comprising a flexible wire, a plurality of blocks of material softer than the pipe, and means for frictionally connecting the blocks to the wire in spaced relation whereby the blocks may be moved along the wire when subjected to the weight of the pipe to permit the proper settling of the pipe in a pile.

2. A spacer for piling pipe comprising a plurality of blocks of material softer than the pipe, flexible members for connecting adjacent ends of the blocks, and means for frictionally connecting the ends of the blocks to the flexible members whereby the blocks may be moved relative to the flexible members when subjected to the weight of the pipe to permit the proper settling of the pipe in a pile, the spacing of the blocks on the flexible members being in accordance with the diameter of the pipe to be piled.

3. A spacer for piling pipe comprising, in combination, a plurality of blocks of a material softer than the pipe, a flexible member for supporting the blocks, and means for mounting the blocks on the flexible member in spaced relation, said means for supporting the blocks in spaced relation on the flexible member yielding to the weight of the pipe to permit a shifting of the blocks relative to one another when subjected to the weight of the pipe, thereby facilitating the settling of the pipe when piled.

4. A spacer for piling pipe comprising, in combination, a plurality of blocks of a material softer than the pipe, a flexible member for supporting the blocks, and staples for mounting the blocks in spaced relation on the flexible member, the spacing of the blocks being in accordance with the diameter of the pipe to be piled, the staples being disposed to permit a shifting of the blocks along the flexible member to permit the pipe to settle when piled.

5. A spacer for piling pipe comprising, in combination, a plurality of blocks of a material softer than the pipe, a flexible member for supporting the blocks, and staples for mounting the blocks on the flexible member is paced relation, the staples establishing frictional engagement with the flexible member, thereby providing a connection between the blocks and the flexible member which will permit the shifting of the blocks along the flexible member when it is subjected to the weight of the pipe during piling.

6. A spacer for piling pipe comprising, in combination, a plurality of blocks of a predetermined thickness to give a desired spacing of the pipe to be piled, flexible means extending between adjacent ends of the blocks to retain them in spaced relation, and a connection between the blocks and the flexible members for normally retaining them in predetermined spaced relation on the flexible means and that will permit a relative movement of the blocks when subjected to the weight of the pipe to permit the settling of the pipe when piled.

7. A spacer for piling pipe comprising, in combination, a flexible member and a plurality of blocks mounted in spaced relation on the flexible member, said blocks being so spaced that when a spacer is placed in a horizontal position across a layer of pipe, a pair of blocks rest on each pipe and are inclined downwardly and outwardly to receive the pipe of the next layer.

GEORGE B. HETHERINGTON.

CERTIFICATE OF CORRECTION.

Patent No. 1,921,228.      August 8, 1933.

GEORGE B. HETHERINGTON.

It is hereby certified that error appears in the printed specification of the above numbered patent requiring correction as follows: Page 1, line 29, for "members" read member; page 2, line 20, claim 1, for "In a" read A; and that the said Letters Patent should be read with these corrections therein that the same may conform to the record of the case in the Patent Office.

Signed and sealed this 15th day of May, A. D. 1934.

Bryan M. Battey (Seal)      Acting Commissioner of Patents.

Wooden blocks are suitable for constructing spacers since they have a high coefficient of friction and when used in piling pipe in cars, will offer great resistance to longitudinal movement of the pipe when the cars are subjected to sudden shocks such as occur during stopping and starting and the shunting of the car in freight yards. However, there are many other suitable materials which possess the same characteristics as wood.

Since numerous changes may be made in the above described structures and different embodiments of the invention may be made without departing from the spirit and scope thereof, it is intended that all matter contained in the above description or shown in the accompanying drawing shall be interpreted as illustrative and not in a limiting sense.

I claim:

1. In a spacer for piling pipe comprising a flexible wire, a plurality of blocks of material softer than the pipe, and means for frictionally connecting the blocks to the wire in spaced relation whereby the blocks may be moved along the wire when subjected to the weight of the pipe to permit the proper settling of the pipe in a pile.

2. A spacer for piling pipe comprising a plurality of blocks of material softer than the pipe, flexible members for connecting adjacent ends of the blocks, and means for frictionally connecting the ends of the blocks to the flexible members whereby the blocks may be moved relative to the flexible members when subjected to the weight of the pipe to permit the proper settling of the pipe in a pile, the spacing of the blocks on the flexible members being in accordance with the diameter of the pipe to be piled.

3. A spacer for piling pipe comprising, in combination, a plurality of blocks of a material softer than the pipe, a flexible member for supporting the blocks, and means for mounting the blocks on the flexible member in spaced relation, said means for supporting the blocks in spaced relation on the flexible member yielding to the weight of the pipe to permit a shifting of the blocks relative to one another when subjected to the weight of the pipe, thereby facilitating the settling of the pipe when piled.

4. A spacer for piling pipe comprising, in combination, a plurality of blocks of a material softer than the pipe, a flexible member for supporting the blocks, and staples for mounting the blocks in spaced relation on the flexible member, the spacing of the blocks being in accordance with the diameter of the pipe to be piled, the staples being disposed to permit a shifting of the blocks along the flexible member to permit the pipe to settle when piled.

5. A spacer for piling pipe comprising, in combination, a plurality of blocks of a material softer than the pipe, a flexible member for supporting the blocks, and staples for mounting the blocks on the flexible member is paced relation, the staples establishing frictional engagement with the flexible member, thereby providing a connection between the blocks and the flexible member which will permit the shifting of the blocks along the flexible member when it is subjected to the weight of the pipe during piling.

6. A spacer for piling pipe comprising, in combination, a plurality of blocks of a predetermined thickness to give a desired spacing of the pipe to be piled, flexible means extending between adjacent ends of the blocks to retain them in spaced relation, and a connection between the blocks and the flexible members for normally retaining them in predetermined spaced relation on the flexible means and that will permit a relative movement of the blocks when subjected to the weight of the pipe to permit the settling of the pipe when piled.

7. A spacer for piling pipe comprising, in combination, a flexible member and a plurality of blocks mounted in spaced relation on the flexible member, said blocks being so spaced that when a spacer is placed in a horizontal position across a layer of pipe, a pair of blocks rest on each pipe and are inclined downwardly and outwardly to receive the pipe of the next layer.

GEORGE B. HETHERINGTON.

CERTIFICATE OF CORRECTION.

Patent No. 1,921,228.   August 8, 1933.

GEORGE B. HETHERINGTON.

It is hereby certified that error appears in the printed specification of the above numbered patent requiring correction as follows: Page 1, line 29, for "members" read member; page 2, line 20, claim 1, for "In a" read A; and that the said Letters Patent should be read with these corrections therein that the same may conform to the record of the case in the Patent Office.

Signed and sealed this 15th day of May, A. D. 1934.

Bryan M. Battey (Seal)   Acting Commissioner of Patents.

CERTIFICATE OF CORRECTION.

Patent No. 1,921,228.                                              August 8, 1933.

GEORGE B. HETHERINGTON.

It is hereby certified that error appears in the printed specification of the above numbered patent requiring correction as follows: Page 1, line 29, for "members" read member; page 2, line 20, claim 1, for "In a" read A; and that the said Letters Patent should be read with these corrections therein that the same may conform to the record of the case in the Patent Office.

Signed and sealed this 15th day of May, A. D. 1934.

Bryan M. Battey (Seal)                                                   Acting Commissioner of Patents.